United States Patent
Marunaka

(10) Patent No.: US 12,066,059 B2
(45) Date of Patent: Aug. 20, 2024

(54) ROLLER SEATING DEVICE FOR TAPERED ROLLER BEARINGS

(71) Applicant: The Timken Company, North Canton, OH (US)

(72) Inventor: Hiroshi Marunaka, North Canton, OH (US)

(73) Assignee: The Timken Company, North Canton, OH (US)

( * ) Notice: Subject to any disclaimer, the term of this patent is extended or adjusted under 35 U.S.C. 154(b) by 395 days.

(21) Appl. No.: 16/967,326

(22) PCT Filed: Oct. 11, 2018

(86) PCT No.: PCT/US2018/055351
§ 371 (c)(1),
(2) Date: Aug. 4, 2020

(87) PCT Pub. No.: WO2019/156720
PCT Pub. Date: Aug. 15, 2019

(65) Prior Publication Data
US 2020/0362917 A1 Nov. 19, 2020

Related U.S. Application Data

(60) Provisional application No. 62/627,348, filed on Feb. 7, 2018.

(51) Int. Cl.
*F16C 43/06* (2006.01)
*B23P 15/00* (2006.01)
*F16C 19/38* (2006.01)

(52) U.S. Cl.
CPC .......... *F16C 43/065* (2013.01); *B23P 15/003* (2013.01); *F16C 19/383* (2013.01)

(58) Field of Classification Search
CPC ..... F16C 43/06; F16C 43/065; F16C 2229/00
See application file for complete search history.

(56) References Cited

U.S. PATENT DOCUMENTS 2,195,795 A 4/1940 Baker
2,703,738 A 3/1955 Palmgren et al.
(Continued)

FOREIGN PATENT DOCUMENTS

CN 101194003 A 6/2008
CN 101484716 A 7/2009
(Continued)

OTHER PUBLICATIONS

Machine translation of WO-2016114195-A1 (Year: 2016).*
(Continued)

*Primary Examiner* — Kyle A Cook
(74) *Attorney, Agent, or Firm* — Michael Best & Friedrich LLP

(57) ABSTRACT

An assembly tool (104) for positioning the rolling elements (150, 155) of a bearing assembly (100) during a preloading operation includes a roller seating actuator (400) configured to be removably coupled to a portion of the bearing assembly during the preloading operation, and a roller seating ring (420) movably coupled to the roller seating actuator. The roller seating ring includes a distal end (440) configured to engage an end of a rolling element of the bearing assembly. A biasing member (460) is positioned between the roller seating actuator and the roller seating ring and biases the roller seating ring away from roller seating actuator such that the distal end of the roller seating ring engages and presses the rolling element axially into engagement with a rib (145) of a race of the bearing assembly.

21 Claims, 7 Drawing Sheets

(56) References Cited

U.S. PATENT DOCUMENTS

| | | | |
|---|---|---|---|
| 3,716,280 A * | 2/1973 | Leibensperger et al. | ............... F16C 19/56 384/99 |
| 4,614,446 A | 9/1986 | Dreschmann et al. | |
| 4,780,003 A | 10/1988 | Bauer et al. | |
| 5,009,525 A | 4/1991 | Brockmuller et al. | |
| 5,249,872 A | 10/1993 | Rhodes et al. | |
| 5,281,036 A | 1/1994 | Rhodes | |
| 7,572,061 B2 | 8/2009 | Fox et al. | |
| 7,757,402 B2 | 7/2010 | Seo et al. | |
| 7,900,356 B2 | 3/2011 | Fuse | |
| 8,061,038 B2 | 11/2011 | Shimizu et al. | |
| 8,186,887 B2 * | 5/2012 | Magami | ............ F16C 19/55 384/562 |
| 8,596,877 B2 | 12/2013 | Kanbori et al. | |
| 9,061,545 B2 | 6/2015 | Horn et al. | |
| 2003/0106384 A1 | 6/2003 | Yokota et al. | |
| 2011/0206310 A1 | 8/2011 | Ventzke | |
| 2017/0122367 A1 | 5/2017 | Wilm | |
| 2017/0211625 A1 * | 7/2017 | Katsaros | ............... F16C 19/386 |

FOREIGN PATENT DOCUMENTS

| | | | |
|---|---|---|---|
| CN | 102042333 A | 5/2011 | |
| CN | 104943741 A | 9/2015 | |
| CN | 105723106 A | 6/2016 | |
| DE | 1929815 U | 12/1965 | |
| DE | 102007003470 A1 | 7/2008 | |
| EP | 2754893 A1 | 7/2014 | |
| EP | 2754893 A1 * | 7/2014 | ............ F03B 13/264 |
| GB | 662165 A | 12/1951 | |
| GB | 2377974 A * | 1/2003 | ............ F16C 41/045 |
| JP | 2014020380 A | 2/2014 | |
| JP | 2014020389 A | 2/2014 | |
| WO | 2005075844 A1 | 8/2005 | |
| WO | WO-2005075844 A1 * | 8/2005 | ............ F16C 19/225 |
| WO | 2016114195 A1 | 7/2016 | |
| WO | 2017007922 A1 | 1/2017 | |
| WO | WO-2017007922 A1 * | 1/2017 | |

OTHER PUBLICATIONS

European Patent Office Action for Application No. 18797280.7 dated Apr. 28, 2022 (5 pages).

European Patent Office Action for Application No. 18797280.7 dated Oct. 21, 2021 (9 pages).

Chinese Patent Office Action for Application No. 201880092082.3 dated Mar. 14, 2022 (18 pages including English translation).

Chinese Patent Office Action for Application No. 201880092082.3 dated Jul. 27, 2021 (23 pages including English translation).

Gu et al., "Study on the Preload in the Static Load-Carrying Capacity of Single-Four-Contact-Point Slewing Bearings," Equipment Manufacturing Technology, Oct. 15, 2015, pp. 249-250 (English abstract included).

International Search Report and Written Opinion for Application No. PCT/US2018/055351 dated Jan. 31, 2019 (17 pages).

* cited by examiner

ROLLER SEATING DEVICE FOR TAPERED ROLLER BEARINGS

RELATED APPLICATIONS

This application claims the benefit of U.S. Provisional Patent Application No. 62/627,348 filed Feb. 7, 2018, the entire content of which is hereby incorporated by reference herein.

BACKGROUND

The present invention relates to tapered roller bearings, and more specifically to bearings used for supporting a mainshaft of a wind turbine.

FIG. 1 illustrates a conventional wind turbine drive train configuration 10 including a three-point mounting system 12. Specifically, the wind turbine drive train configuration 10 supports turbine blades 15 coupled to a nosecone 20, which in turn, is coupled to a wind turbine mainshaft 25 on three points of support. A first support is an upwind pillowblock 30 that normally contains a two-row spherical roller bearing 32 and is attached to a bedplate 35. Second and third supports are downwind and are two attachment points 40, 45 (e.g., torque arms) that are attached to the bedplate 35. Each torque arm 40, 45 is positioned on a side of a gearbox 50.

FIG. 2 illustrates a four-point mounting system 55 of another conventional wind turbine drive train configuration 10'. The four-point mounting system 55 supports the mainshaft 25 upwind and downwind on two pillowblocks 30. Each pillowblock 30 contains a two-row spherical roller bearing 32. Combined, there are four-supporting bearing rows in a four-point mounting.

In service, it often becomes necessary to perform maintenance and to replace the spherical roller bearing 32 in at least one of the pillowblocks 30. It has become known to replace existing bearings (e.g., spherical roller bearings) with split, tapered roller bearings. Using split bearings enables the bearings to be replaced without having to disconnect the mainshaft from the rest of the wind turbine. A double row tapered roller bearing inside the pillowblock housing has been used as a preferred design because it can be preloaded to optimize load zones in both rows for improving bearing life and controlling the radial and axial motion of the rotor assembly. One such double row tapered roller bearing is described in PCT Published Application No. WO 2017/007922, the entire content of which is incorporated herein by reference.

SUMMARY

In one embodiment, the invention provides an assembly tool for positioning the rolling elements of a bearing assembly during a preloading operation. The assembly tool includes a roller seating actuator configured to be removably coupled to a portion of the bearing assembly during the preloading operation, and a roller seating ring movably coupled to the roller seating actuator. The roller seating ring includes a distal end configured to engage an end of a rolling element of the bearing assembly. A biasing member is positioned between the roller seating actuator and the roller seating ring and biases the roller seating ring away from roller seating actuator such that the distal end of the roller seating ring engages and presses the rolling element axially into engagement with a rib of a race of the bearing assembly.

In another embodiment the invention provides a method of installing and preloading a roller bearing assembly about a shaft. The roller bearing assembly includes an inner ring defining thereon an inner raceway, an outer ring defining thereon an outer raceway, a rib adjacent at least one of the inner and outer raceways, a plurality of rolling elements positioned between the inner and outer raceways, a housing radially outside of the outer ring, and a clamping plate coupled with the housing via an adjustable clamping member and abutting the outer ring. The method includes installing each of the inner ring, the outer ring, the plurality of rolling elements, the housing, and the clamping plate about the shaft and removably coupling an assembly tool to at least one of the housing and the clamping plate. The assembly tool includes a roller seating actuator removably coupled to at least one of the housing and the clamping plate, and a roller seating ring movably coupled to the roller seating actuator. The roller seating ring includes a distal end engaging respective ends of the rolling elements of the bearing assembly. A biasing member is positioned between the roller seating actuator and the roller seating ring and biases the roller seating ring away from roller seating actuator such that the distal end of the roller seating ring engages and presses the rolling elements axially into engagement with the rib. The method further includes preloading the bearing assembly by adjusting the adjustable clamping member while the rolling elements are pressed against the rib by the assembly tool, and removing the assembly tool from the bearing assembly after the preloading step has been completed.

In yet other embodiments, the biasing member could be eliminated such that the roller seating actuator and the roller seating ring are axially spaced by a fixed distance. The mounting of the roller seating actuator to the bearing assembly could create the desired axial force on the rollers. In such embodiments, the roller seating actuator and the roller seating ring could be integrated into a single part.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

This invention was developed originally for use with a split pillowblock bearing used for supporting a mainshaft of a wind turbine and will be described as used in that application. However, this invention can also be used in other applications benefitting from split bearings in both pillowblock and non-pillowblock applications. For example, split bearings are often used in industries such as power generation, pulp and paper, mining, cement, metals, marine and waste water. Common applications are pulverizers, crushers, fans, blowers, centrifuges, conveyors, and marine propulsion shafts.

Figure 1:
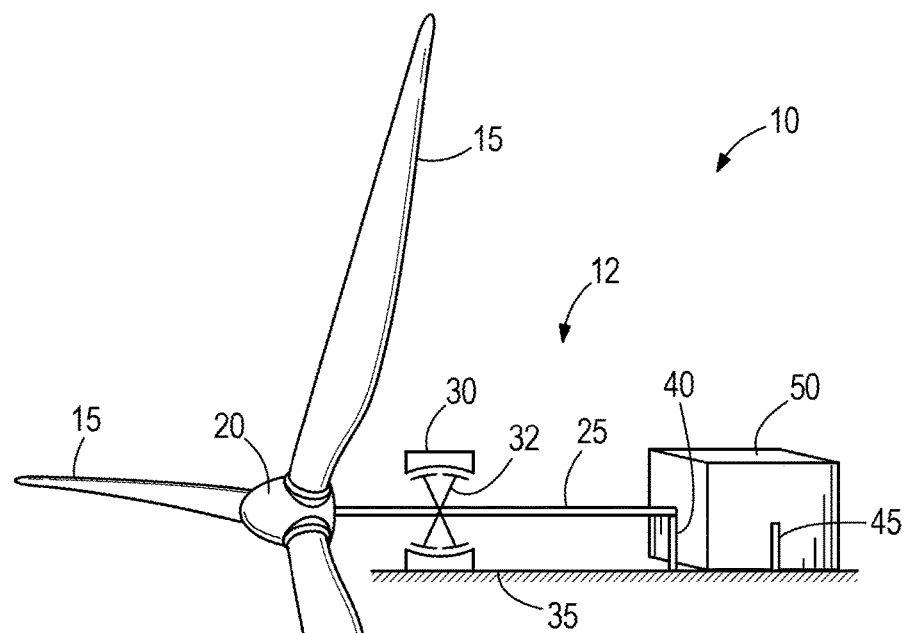
FIG. 1 illustrates a conventional three-point mounting arrangement for a wind turbine mainshaft.
Figure 2:
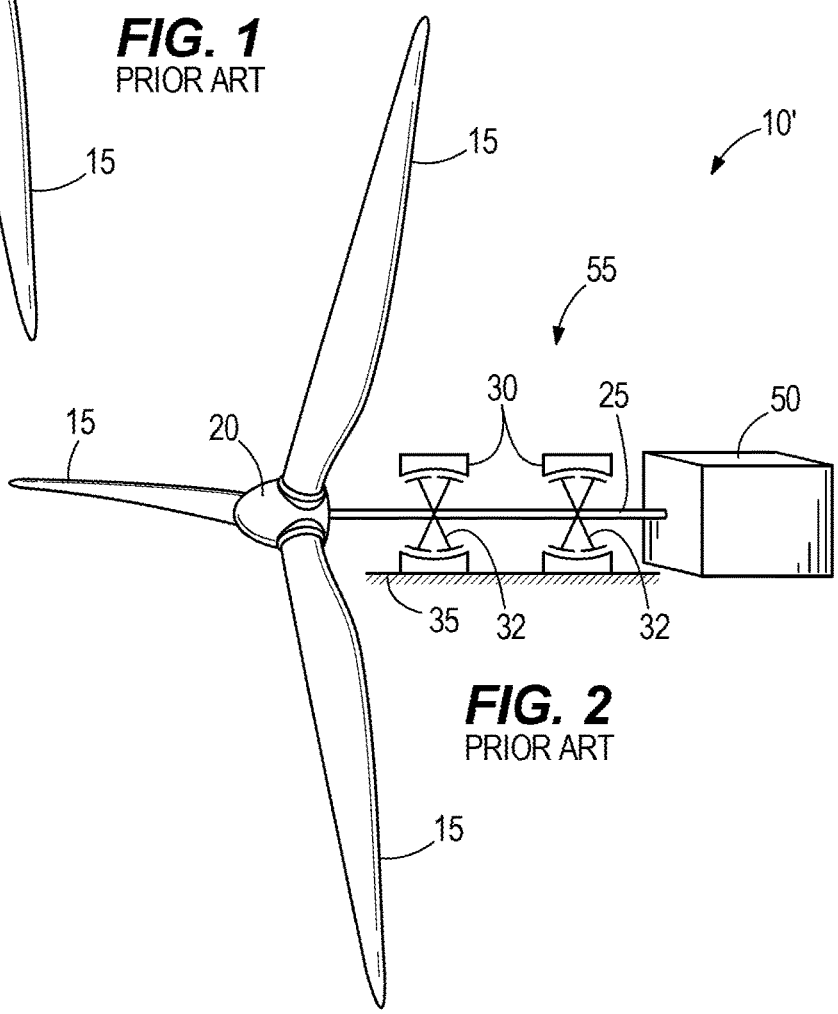
FIG. 2 illustrates a conventional four-point mounting arrangement for a wind turbine mainshaft.
Figure 3:
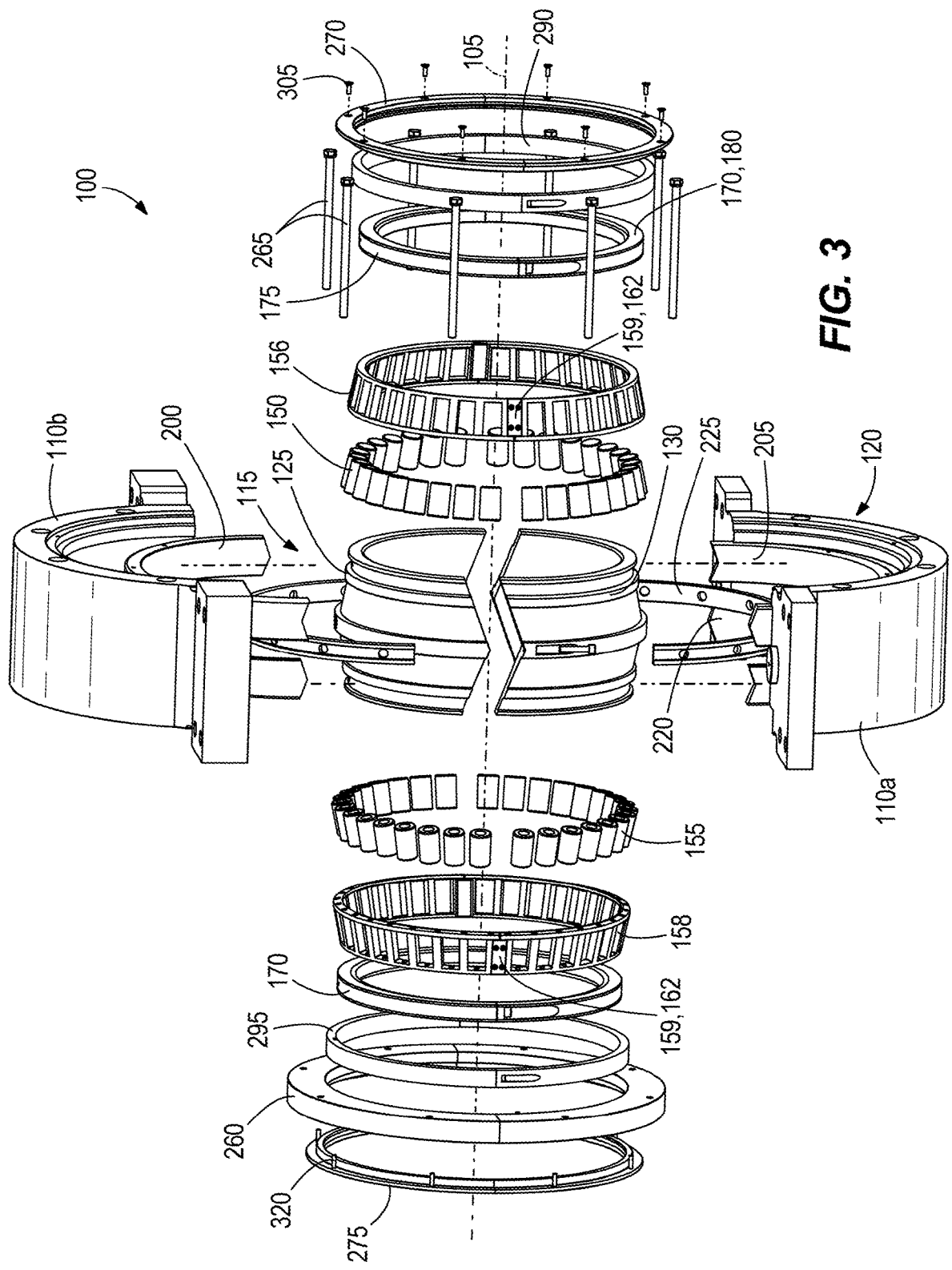
FIG. 3 is an exploded view of a split pillowblock and bearing assembly configured to rotatably support a wind turbine mainshaft.
Figure 4:
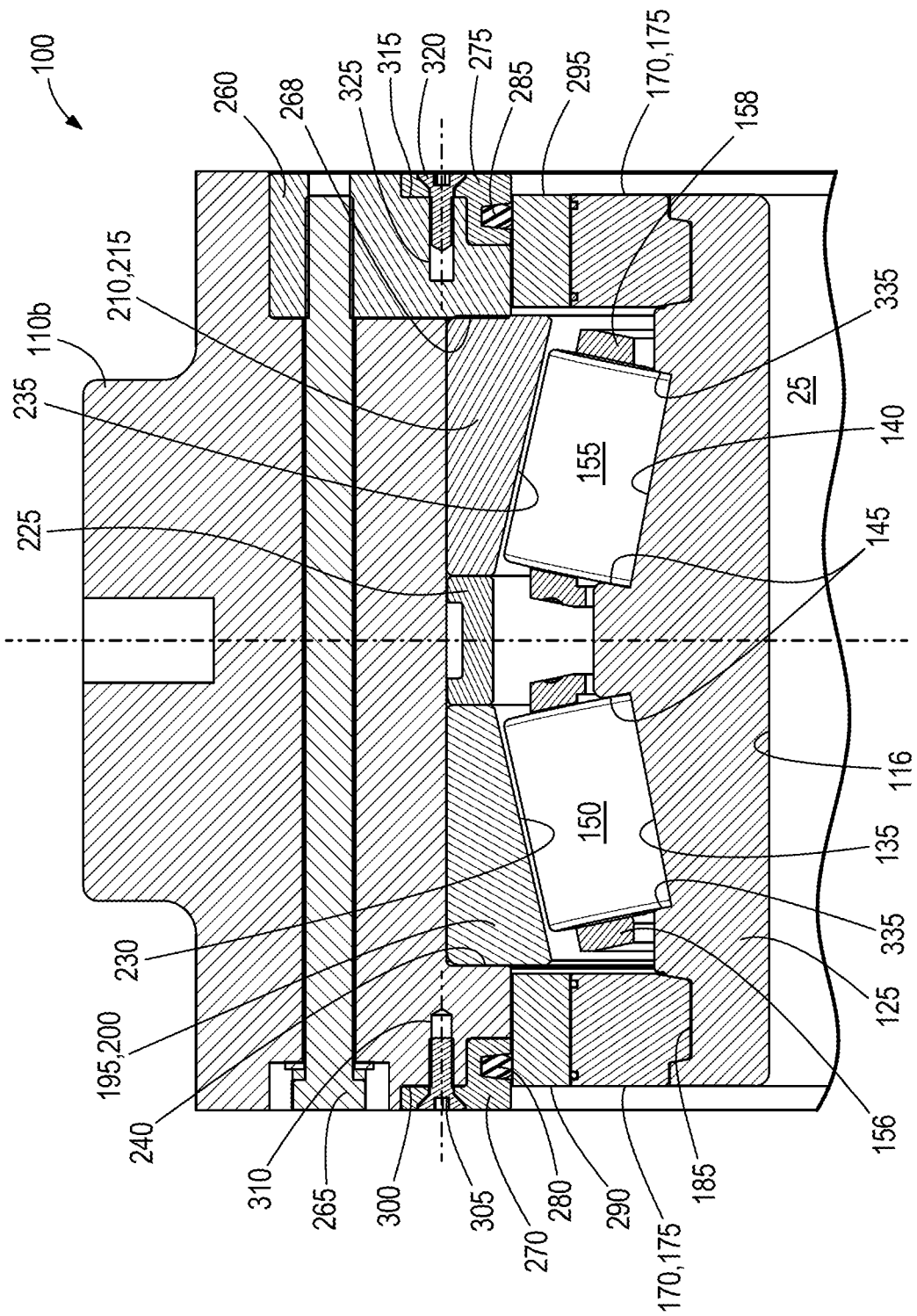
FIG. 4 is a section view of the split pillowblock and bearing assembly of FIG. 3

FIGS. 3 and 4 illustrate a split pillowblock and bearing assembly 100 coupled to the wind turbine mainshaft 25 about a bearing central axis 105 (see FIG. 3). The split pillowblock and bearing assembly 100 can be installed with the aid of an assembly tool 104, 104' (see FIGS. 5-10) in the form of a roller seating device embodying the present invention. The bearing assembly 100 can be a replacement to an existing spherical or other type of bearing being removed from the wind turbine, or can be an original bearing in a newly-constructed wind turbine. Referring to FIG. 3, split housing is defined by pillowblocks (i.e., a lower pillowblock 110a and an upper pillowblock 110b) fixable to the bedplate 35 of the wind turbine 10 by pillowblock bolts (not shown). In the illustrated embodiment, four pillowblock bolts are used to fix the pillowblock 110 to the bedplate 35. The illustrated split pillowblock and bearing assembly 100 includes an inner race ring assembly 115 coupled to a bearing seat 116 (FIGS. 4 and 5) of the mainshaft 25 for rotational movement with the mainshaft 25. The bearing seat 116 of the mainshaft 25 is the surface area of the mainshaft 25 that directly contacts the inner race ring assembly 115. The split pillowblock and bearing assembly 100 also includes an outer race ring assembly 120 (FIG. 3) fixed to the pillowblock 110 and positioned between the lower and upper pillowblocks 110a, 110b and the inner race ring assembly 115.

The inner race ring assembly 115 defines a two-piece inner race ring having first and second inner ring halves 125, 130 that are connected together about the mainshaft 25 using bolts (not shown). Each inner ring half 125, 130 spans about 180 degrees in arc length and includes two inner raceways 135, 140 (see FIG. 4) that are separated by a central rib 145. First and second series of rolling elements 150, 155 (e.g., tapered rollers) are positioned within a corresponding inner raceway 135, 140. This configuration is often referred to as a "tapered double inner" or TDI race. The central rib 145 is sized and configured to guide and separate the series of rolling elements 150, 155 about the bearing central axis 105. In addition, the first series of rolling elements 150 are positioned or spaced about the inner ring halves 125, 130, and therefore about the bearing central axis 105, by a first two-piece cage 156. The second series of rolling elements 155 are also positioned or spaced about the inner ring halves 125, 130, and therefore about the bearing central axis 105, by a second two-piece cage 158. The two pieces of each cage 156, 158 are rigidly jointed together by fasteners 159. In particular, cage links 162 (FIG. 3) span between the two pieces of each cage 156, 158 for the fasteners 159 to rigidly couple the two pieces of each cage 156, 158 together. In one embodiment, roller retainers may temporarily hold the rolling elements 150, 155 within the corresponding cage 156, 158 during assembly of the split pillowblock and bearing assembly 100, as described in detail below.

Once the inner ring halves 125, 130 are connected together about the mainshaft 25 by the bolts, corresponding inner raceways 135, 140 of each inner ring half 125, 130 align to form a continuous inner raceway 135, 140. In other embodiments, the inner race ring assembly 115 may have more than two halves or portions (e.g., the inner race ring assembly 115 may include three portions spanning about 120 degrees in arc length).

With continued reference to FIGS. 3 and 4, the illustrated inner race ring assembly 115 is further coupled to the mainshaft 25 by clamping rings or bands 170 including first and second band halves 175, 180 coupled together by clamping band bolts (not shown). The illustrated clamping bands 170 are sized and configured to fix the inner ring halves 125, 130 relative to the mainshaft 25 to inhibit precession of the inner ring halves 125, 130 and the mainshaft 25. In other words, the clamping bands 170 provide an anti-precession mechanism to inhibit relative movement between the inner race ring assembly 115 and the mainshaft 25. Each of the first and second band halves 175, 180 are received within grooves or recesses 185 of the inner ring halves 125, 130. In the illustrated embodiment, each inner raceway 135, 140 is positioned between the central rib 145 and one clamping band 170. The illustrated first and second band halves 175, 180 span less than 180 degrees in arc length such that split regions or gaps are provided between the first and second band halves 175, 180 when the first and second band halves 175, 180 are coupled to the inner race ring assembly 115. In the illustrated embodiment, the split regions are circumferentially offset from the split lines of the inner ring halves 125, 130. In other embodiments, the clamping bands 170 may have more than two halves or portions (e.g., the clamping bands 170 may include three portions spanning less than 120 degrees in arc length). In further embodiments, the portions of the clamping bands 170 may abut (e.g., the first and second band halves 175, 180 span about 180 degrees in arc length to omit the gaps).

With reference to FIGS. 3 and 4, the illustrated outer race ring assembly 120 includes a first two-piece outer race ring 195, having a first upper half 200 and a second lower half 205, separated from a second two-piece outer race ring 210, having a first upper half 215 and a second lower half 220, by a two-piece outer race spacer 225. The illustrated first two-piece outer race ring 195 also includes a first outer raceway 230 that aligns with the first inner raceway 135 of the inner race ring assembly 115, and the illustrated second two-piece outer race ring 210 also includes a second outer raceway 235 that aligns with the second inner raceway 140 of the inner race ring assembly 115. As such, the first series of rolling elements 150 are engageable between the first inner and outer raceways 135, 230, and the second series of rolling elements 155 are engageable between the second inner and outer raceways 140, 235.

The illustrated first two-piece outer race ring 195 abuts a shoulder 240 of the upper and lower pillowblocks 110a, 110b to axially position the outer race ring 195 within the pillowblocks 110a, 110b. The spacer 225 abuts the first two-piece outer race ring 195 and the second two-piece outer race ring 210 abuts the spacer 225 opposite to the first two-piece outer race ring 195.

With continued reference to FIGS. 3 and 4, the split pillowblock and bearing assembly 100 also includes a two-piece clamping plate 260 coupled to the pillowblocks 110a, 110b via a plurality of adjustable clamping members 265 (e.g., bolts). The clamping plate 260 axially retains the first two-piece outer race ring 195, the second two-piece outer race ring 210, and the spacer 225 between the shoulder 240 of the pillowblocks 110a, 110b and an axially inner surface 268 of the clamping plate 260. The clamping plate 260 and adjustable clamping members 265 also operate to preload the bearing assembly 100 to improve the life of the split pillowblock and bearing assembly 100. By presetting the width of the spacer 225 and adjusting the amount of torque applied to the adjustable clamping members 265, the axial position of the first and second outer race rings 195, 210 can be adjusted relative to the inner raceways 135, 140, thereby changing the preload on the rollers 150, 155, and hence the preload of bearing assembly 100.

The split pillowblock and bearing assembly 100 also includes sealing arrangements at both axial ends of the bearing. As best seen in FIG. 4, first and second split seal carriers 270, 275 each include a groove that retains a respective split seal member 280, 285. The seal members 280, 285 sealingly engage and run on the outer diameter surfaces of respective split seal wear rings 290, 295, which are coupled to the clamping bands 170. The first seal carrier 270 is secured to an axial end face 300 of the pillowblock 110a, 110b via seal carrier fasteners 305 received in threaded bores 310 formed in the axial end face 300. The second seal carrier 275 is secured to an axial end face 315 of the split clamping plate 260 via seal carrier fasteners 320 received in threaded bores 325 formed in the axial end face 315.

A method of replacing an existing pillowblock and bearing assembly (e.g., the pillowblock 30 and the two-row spherical roller bearing 32) on the mainshaft 25 with the illustrated split pillowblock and bearing assembly 100 is described in detail below. The method includes supporting and bracing the mainshaft 25 with, for example, hydraulic jack stands in preparation to remove the existing pillowblock and bearing assembly 30, 32 from the bedplate 35. The existing pillowblock and bearing assembly 30, 32 is unsecured from the bedplate 35 by removing bolts that couple the existing pillowblock and bearing assembly 30, 32 to the bedplate 35 (similar to the pillowblock bolts 112). The existing pillowblock and bearing assembly 30, 32 is then cut off (e.g., by using a gas-flamed torch, grinder, etc.) the mainshaft 25 to remove the existing pillowblock and bearing assembly 30, 32 from the mainshaft 25. The bearing seat 116 is reconditioned and a diameter of the mainshaft 25 is measured to ensure proper fit and clearance between the split pillowblock and bearing assembly 100 and the mainshaft 25 (e.g., optimize an amount of internal clearance built into the split pillowblock and bearing assembly 100).

Once the existing pillowblock and bearing assembly 30, 32 is removed from the mainshaft 25 and the mainshaft 25 reconditioned, the illustrated split pillowblock and bearing assembly 100 can then be installed onto the mainshaft 25. In particular, the first and second inner ring halves 125, 130 of the two-piece inner race ring assembly 115 are connected together around the mainshaft 25 by the inner race bolts, and the two-piece clamping bands 170 are clamped over the first and second inner ring halves 125, 130 by the clamping band bolts to further secure the first and second inner ring halves 125, 130 on the mainshaft 25. The illustrated clamping bands 170 are also tightened around the first and second inner ring halves 125, 130 to aid in alignment of the first and second inner ring halves 125, 130 axially along the bearing central axis 105 (e.g., the clamping bands 170 aid in alignment of the inner raceways 135, 140). Furthermore, the clamping bands 170 provide a mechanical anti-rotating feature (i.e., the anti-precession mechanism 184) of the two-piece inner race ring assembly 115 relative to the mainshaft 25. For example, the clamping bands 170 can be tightened as much as possible to establish the gripping force that is needed to prevent precessing of the inner race ring assembly 115 on the mainshaft 25.

The method of installing the illustrated split pillowblock and bearing assembly 100 further includes coupling the outer race ring assembly 120, which is affixed to the pillowblock 110, to the inner race ring assembly 115 with the first and second series of rolling elements 150, 155 positioned therebetween. For example, the first and second two-piece retainers 156, 158 are coupled about the inner race ring assembly 115 before the mainshaft 25 can be lowered into the lower pillowblock 110a. The lower pillowblock 110a, the corresponding portion of the outer race ring assembly 120 (e.g., the second lower halves 205, 220 and one-piece of the two-piece outer race spacer 225) are coupled together and positioned on the bedplate 35. As such, the mainshaft 25 can be lowered into the lower pillowblock 110a by the jack stand for the first and second series of rolling elements 150, 155 to engage the raceways 135, 140, 230, 235.

The upper pillowblock 110b, the corresponding portion of the outer race ring assembly 120 (e.g., the first upper halves 200, 215 and the other piece of the outer race spacer 225), and clamping plate 260 are coupled together and positioned over the lower pillowblock 110a and the mainshaft 25. The pillowblock bolts then secure the lower and upper pillowblock 110a, 110b to the bedplate 35.

At this point, before the adjustable clamping members 265 and the lower and upper pillowblocks 110a, 110b are fully tightened to preload the split pillowblock and bearing assembly 100 (to withstand loading from wind thrust and induced thrust from each series of rolling elements 150, 155), and before the sealing arrangements are installed, the assembly tool 104 is used to properly position the rollers 150, 155 relative to the raceways. There is clearance for the rollers 150, 155 on the inner raceways 135, 140 between the central rib 145 and respective outer ribs 335. During installation, the weight of the rollers 150, 155 (i.e., gravitational force) tends to urge the rollers 150, 155 away from the central rib 145 and can also cause the rollers 150, 155 to become skewed relative to the raceways. This movement, skewing, and otherwise improper positioning of the roller 150, 155 can damage the raceways in a manner that would detrimentally reduce the working life of the bearing assembly 100. In order to keep the rollers 150, 155 properly positioned and oriented on the raceways during installation, and more specifically during the preloading operation, the assembly tool 104 is used.

Figure 5:
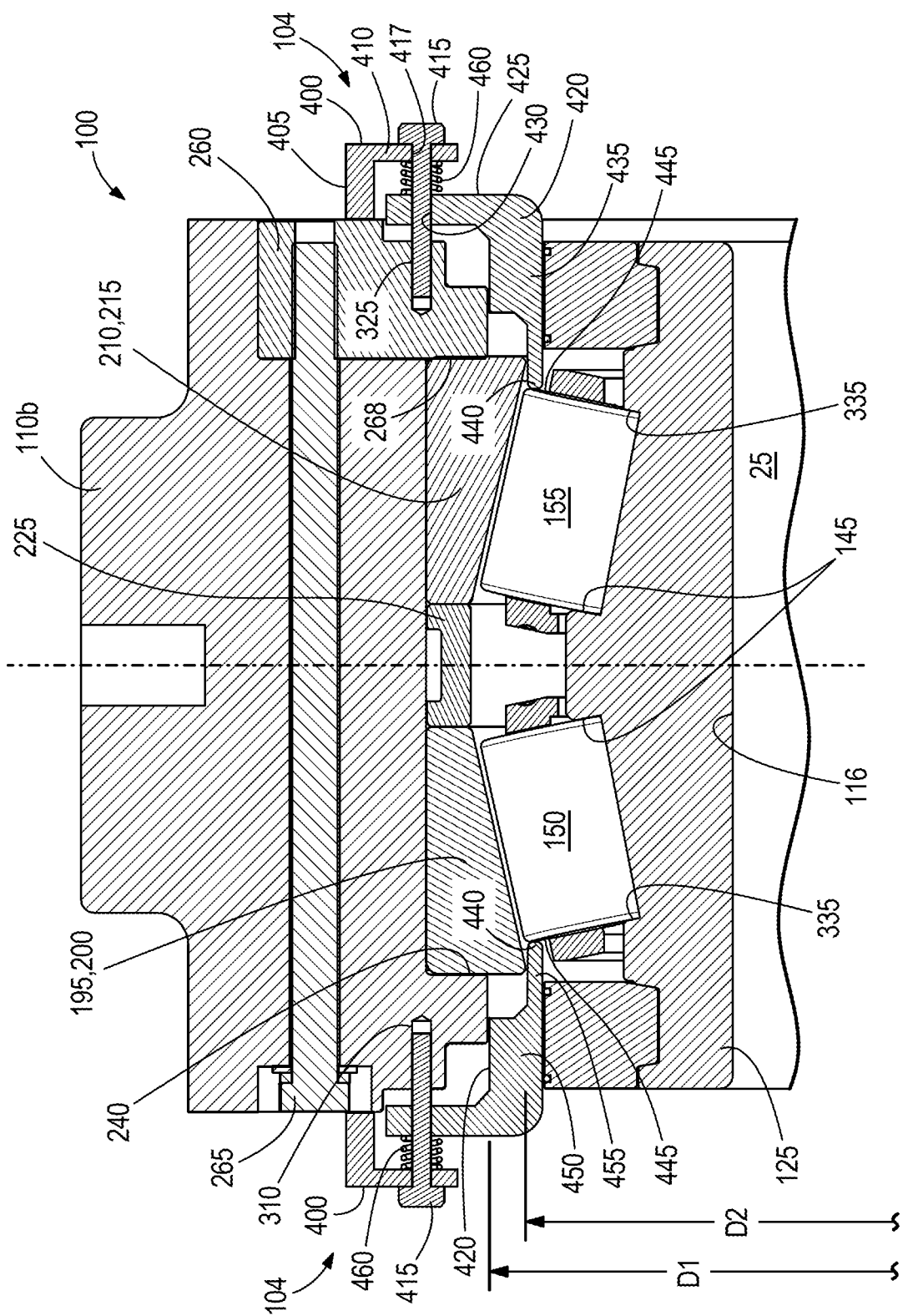
FIG. 5 is a partial section view of the partially-installed split pillowblock and bearing assembly of FIG. 3 illustrating the use of a roller seating device embodying the invention during the installation process.

FIG. 5 illustrates a first embodiment of the assembly tool or roller seating device 104 coupled to the bearing assembly 100 just prior to the preloading operation. As shown in FIG. 5, two assembly tools 104 are shown in use, one at each axial end of the bearing assembly 100. The illustrated assembly tools 104 are identical to one another, so only one will be described below. The tools 104 are split into upper and lower halves (only the upper half is shown in FIG. 5), each extending about 180 degrees. In other embodiments, the tool 104 could have components split into three 120 degree segments, or various other angular split configurations.

The tool 104 includes a roller seating actuator 400 removably coupled to a portion of the bearing assembly 100 during the assembly and installation procedure. As shown in FIG. 5, the tool 104 at the right axial end is coupled directly to the clamping plate 260, while the tool 104 at the left axial end is coupled directly to the pillow block housing 110b. The illustrated roller seating actuator 400 has an L-shaped crosssection with an outer leg 405 that abuts an axial end face of the bearing assembly (e.g., the pillow block housing 110*b* or the clamping plate 260) and an inner leg 410 that extends radially inwardly from the outer leg 405. A plurality of threaded mounting fasteners 415 (only 1 is shown) extend through respective apertures 417 in the inner leg 410 and are positioned to be threadedly engaged with the threaded bores 310, 325 to releasably and temporarily secure the tool 104 to the bearing assembly 100. By using the same bolt pattern as used with the seal carriers 270, 275, the same bores 310 and 325 can be used both for initially mounting the tools 104, and for subsequently mounting the seal carriers 270, 275. Of course, in other embodiments, the tools 104 can be mounted to the bearing assembly 100 in other manners, perhaps using different and dedicated bores formed in various bearing assembly components. The roller seating actuator 400 can be made of steel, other metals, or other rigid materials.

The tool 104 further includes a roller seating ring 420 movably coupled to the roller seating actuator 400. In this illustrated embodiment, the roller seating ring 420 includes a rim portion 425 sized and configured to be positioned adjacent an axial end face of the bearing assembly 100. The rim portion 425 includes a plurality of apertures 430 through which a respective threaded fastener 415 extends with a clearance fit relation. In this manner, the roller seating ring 420 is in part movably coupled to the roller seating actuator 400 by virtue of the threaded fasteners 415 extending through the apertures 430. The roller seating ring 420 further includes an axially-extending lip portion 435 sized and configured to extend axially from the rim portion 425 into the bearing assembly 100 such that a distal end 440 of the lip portion 435 abuts axial end surfaces 445 of one of the rows of rollers 150, 155.

As shown in FIG. 5, the lip portion 435 of the roller seating ring includes a first portion 450 and a second portion 455. The first portion 450 has a first outer diameter D1. The second portion 455 includes the distal end 440, is axially-spaced inwardly from the second portion 455 toward the center of the bearing assembly 100 and away from the rim portion 425, and has a second outer diameter D2 that is smaller than the first outer diameter D1. Together, the first and second portions 450, 455 defined a step in the lip portion 435 that is configured based on the internal components of the bearing assembly 100 to enable the distal end 440 to extend axially into the bearing assembly 100 and engage axially outer end surfaces 445 of the rollers 150 or 155. The specific configuration of the lip portion 435 can be varied as desired depending upon the geometry of the bearing assembly 100. The roller seating ring 420 can be made of a low friction material (e.g., Nylon 66) such that its engagement with the rollers 150, 155 and/or other bearing components will not scratch or otherwise damage those components at the points of contact.

The tool 104 further includes a biasing member 460 positioned between the roller seating actuator 400 and the roller seating ring 420 to bias the roller seating ring 420 away from roller seating actuator 400 (i.e., toward the rollers 150, 155). This enables the distal end 440 of the roller seating ring 420 to engage and press the end surfaces 445 of the rollers 150, 155 in an axial direction into engagement with the central rib 145, yet provides a "floating" relationship between the roller seating ring 420 and the roller seating actuator 400 to introduce play and flexibility into the tool 104. In the illustrated embodiment, the biasing member 460 includes a coil spring placed over at least one of the mounting fasteners 415 and that engages the roller seating actuator 400 at a first end of the spring 460 and engages the roller seating ring 420 at a second end of the spring 460. A spring 460 could be placed over every mounting fastener 415, or less than all of the mounting fasteners 415. In yet other embodiments, other types of biasing members could be used and configured to bias the roller seating actuator 400 and the roller seating ring 420 apart such that the distal end 440 provides the desired force needed to press the roller 150, 155 against the central rib 145, and to also provide the desired play and flexibility. The biasing member 460 (in the form of the coil springs or other members) can be selected to provide the appropriate predetermined amount of force on the rollers 150, 155. The force should be large enough to press or seat the rollers 150, 155 into abutment with the central rib 145, but should not be so large that the friction created between the rollers 150, 155 and the central rib 145 significantly inhibits oscillation of the rollers 150, 155 during assembly and preloading.

In some embodiments, it may be possible to eliminate the biasing members 460 and simply have the roller seating actuator 400 and roller seating ring 420 spaced axially apart by a fixed distance (e.g., by the mounting fasteners 415). In such embodiments, the installation of the roller seating actuator 400 to the bearing assembly 100 via the mounting fasteners 415, if done evenly and carefully, could create the desired force to press the rollers 150, 155 into position against the central rib 145. In such embodiments, the roller seating actuator and the roller seating ring could be integrated into a single part. However, it has been determined that the large size of the bearing assembly 100, the tolerances, the number of mounting fasteners, the care that would be required in torqueing the mounting fasteners 415, and the constrained space within the bearing assembly 100 favor using the biasing members 460 to facilitate the usage and operation of the assembly tool 104.

The illustrated mounting fasteners 415 can be threaded along their entire length provided that the apertures 430 in the rim portion 425 provide sufficient clearance from the threads and that the coil spring 460 has a large enough inner diameter so as not to get caught or hung up on the threads. Alternatively, the mounting fasteners 415 can be threaded only at their distal ends to engage the threaded bores 310, 325, and can be smooth and un-threaded over the remaining portion of the shaft. The axial length of the outer leg 405 can be selected so that with the mounting fasteners 415 tightened down completely, the inner leg 410 is spaced the correct axial distance from the axial end surfaces 445 of the rollers 150, 155. Then, with the proper biasing member(s) 460, the roller seating ring 420 will be adequately spaced axially relative to the roller seating actuator 400 to ensure that the distal end 440 engages the axial end surfaces 445 of the rollers 150, 155 with the desired force to have the rollers 150, 155 properly seat against and abut the central rib 145.

With the rollers 150, 155 properly seated against the central rib 145, the adjustable clamping members 265 and the lower and upper pillowblocks 110*a*, 110*b* are tightened to preload the split pillowblock and bearing assembly 100. As the adjustable clamping members 265 and the lower and upper pillowblocks 110*a*, 110*b* are tightened, the outer rings 195, 201 will be forced axially and radially together to increase the preload of the bearing assembly 100. Once the desired preload is achieved, the rollers 150, 155 are secured in position and orientation between the raceways 135, 140, 230, 235. The assembly tools 104 can then be removed. Removal of the tool 104 is achieved by simply removing the mounting fasteners 415 from the respective bores 310, 325. To then complete the installation of the bearing assembly 100, the seal wear rings 290, 295 can be installed onto the clamping bands 170, the seal members 280, 285 are installed into the split seal carriers 270, 275, and the split seal carriers are installed onto the respective pillowblock housing 110a, 110b and clamping plate 260 via the seal carrier fasteners 305, 320 being installed into the respective threaded bores 310, 325.

FIGS. 6-10 illustrate a second embodiment of the assembly tool or roller seating device 104'. The assembly tool 104' differs in several respects from the assembly tool 104, but still operates to achieve the same function of having the distal end 440' of the roller seating ring 420' engaging and pressing the end surfaces 445 of the rollers 150, 155 in an axial direction into engagement with the central rib 145. The roller seating actuator 400' is generally disc-shaped with no axially-extending arm to engage the axial end surface of the bearing assembly 100. The mounting fasteners 415' still pass though apertures 417' in the roller seating actuator 400' and through apertures 430' in the roller seating ring 420', and are still threadedly engaged in the threaded bores 310, 325. However, the assembly tool 104' further includes additional pins or studs 500 distinct from the mounting fasteners 415' for interconnecting the roller seating actuator 400' and the roller seating ring 420', and for supporting the biasing member(s) 460. The studs 500 each include a head 505 and a distal end 510 spaced from the head 505. The distal ends 510 are secured into apertures 511 in the rim portion 425' of the roller seating ring 420' (e.g., by threaded engagement, weld, press fit, adhesive, or other suitable connection methods). In the illustrated embodiment, the studs 500 are both threaded and secured with adhesive into the apertures 511 in the roller seating ring 420'. The studs 500 pass through apertures 512 in the roller seating actuator 400' and the head 505 constrains the roller seating actuator 400' axially on the studs 500. Washers 515 can also be positioned between the heads 505 and the roller seating actuator 400'. This arrangement makes the tool 104' a more unitized device than the tool 104.

Figure 9:
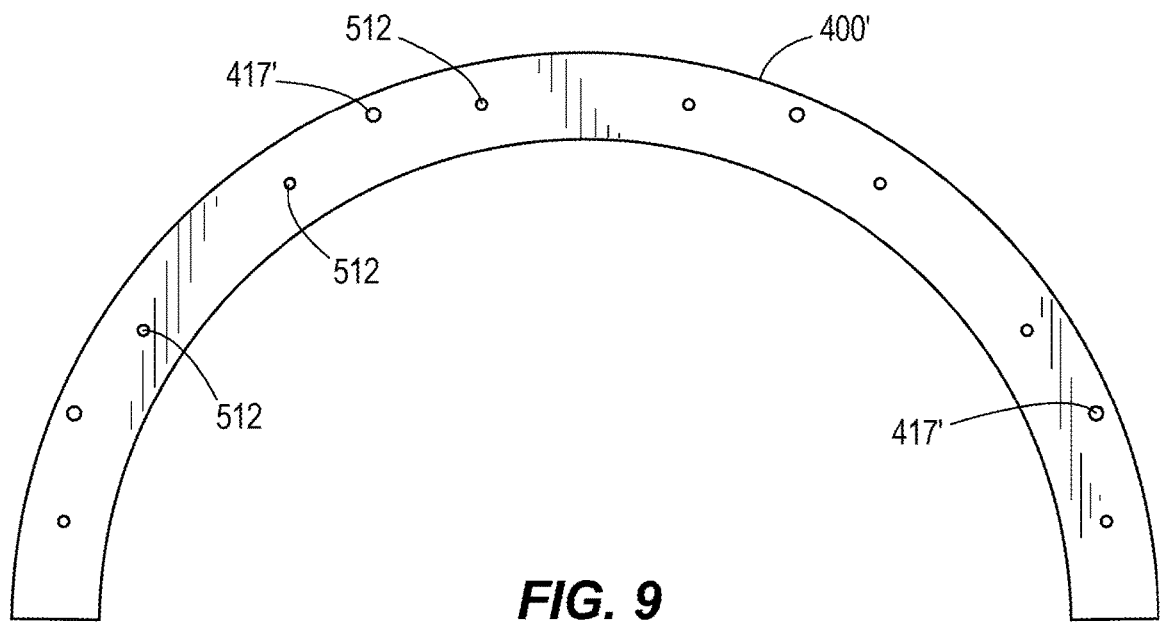
FIG. 9 is a side view of the roller seating actuator of the roller seating device of FIG. 6.
Figure 10:
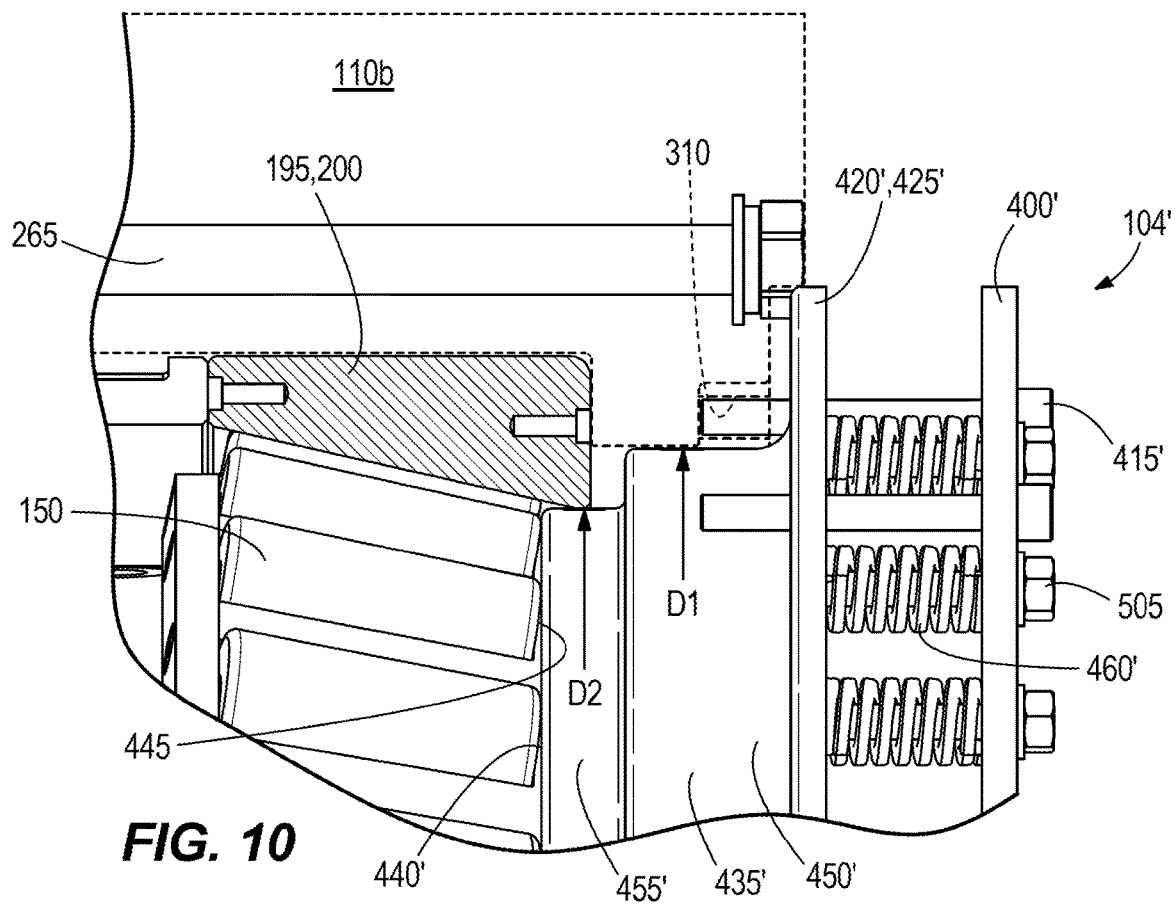
FIG. 10 is a partial section view illustrating the roller seating device of FIG. 6 in use during installation of the split pillowblock and bearing assembly.

A biasing member 460' (e.g., a coil spring) is positioned over some or all of the studs 500, engages the roller seating actuator 400' at a first end of the spring 460', and engages the roller seating ring 420' at a second end of the spring 460'. Thus, the biasing member(s) 460' bias the roller seating actuator 400' and the roller seating ring 420' axially apart. With this arrangement, it may be possible to use fewer mounting fasteners 415', making installation and removal faster and easier, yet the additional studs 500 ensure that the pressing force is adequately and evenly distributed to all of the rollers 150, 155. FIG. 9 illustrates one exemplary hole pattern in the roller seating actuator 400' for the apertures 417' and the apertures 512 (and therefore also for the apertures 430' and 511 in the roller seating ring 420'). Of course, the hole patterns can vary depending upon the bearing assembly 100.

Figure 6:
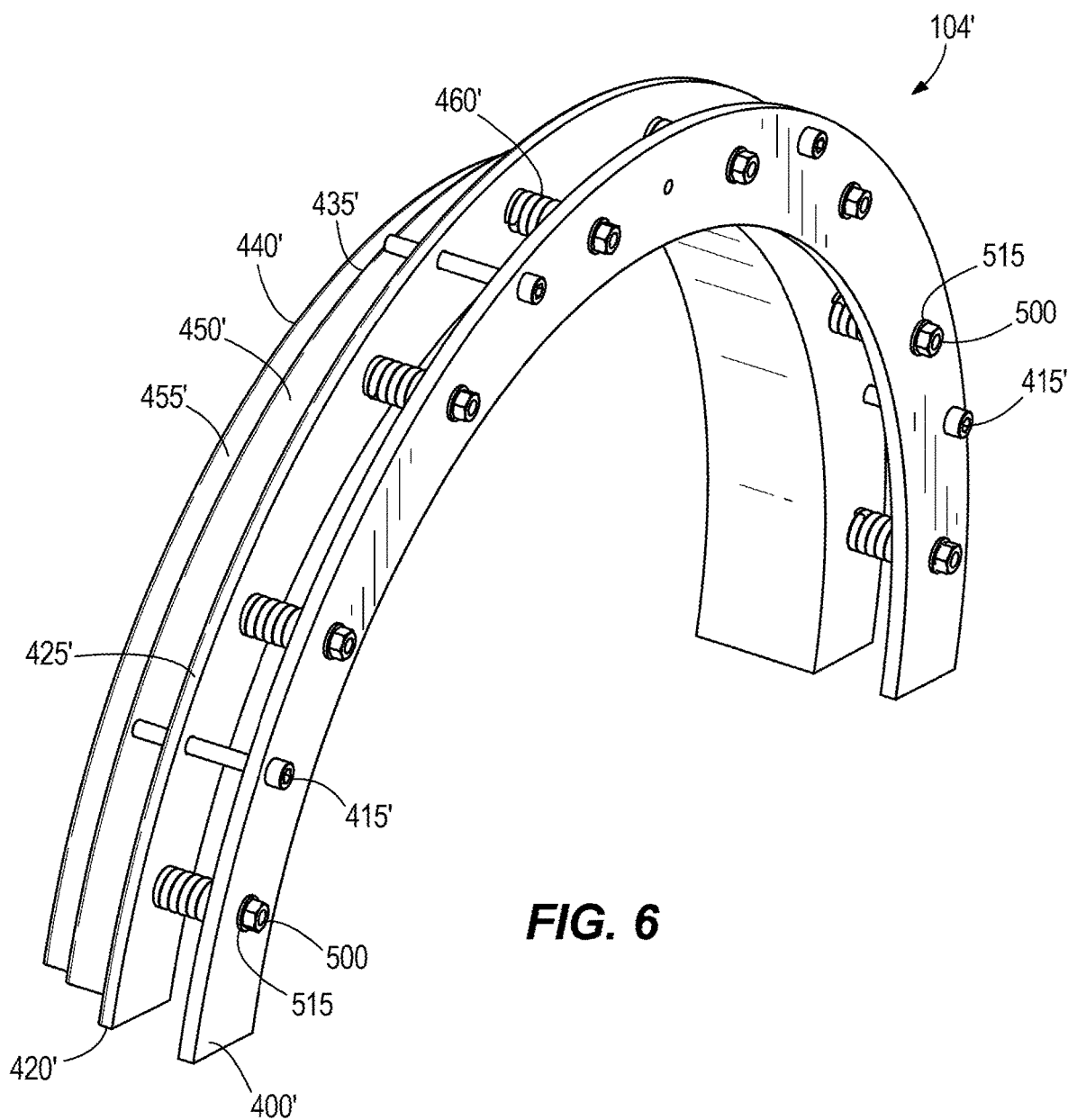
FIG. 6 is a partial perspective view of another roller seating device embodying the invention.
Figure 7:
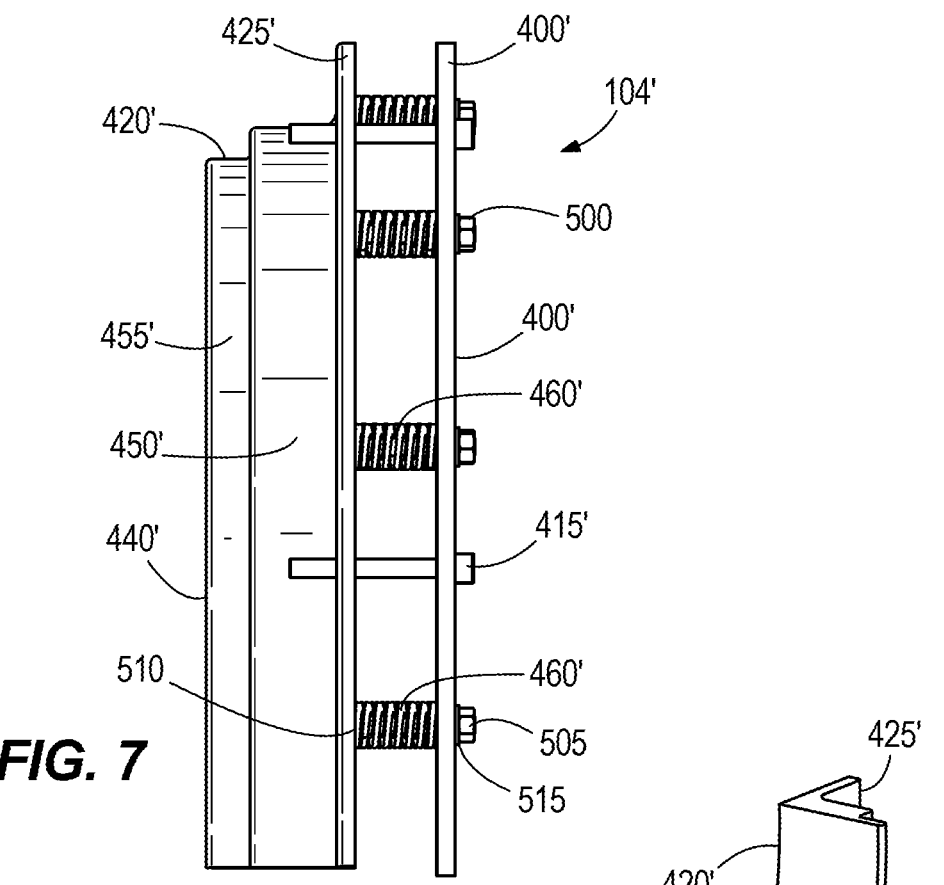
FIG. 7 is an end view of the roller seating device of FIG. 6
Figure 8:
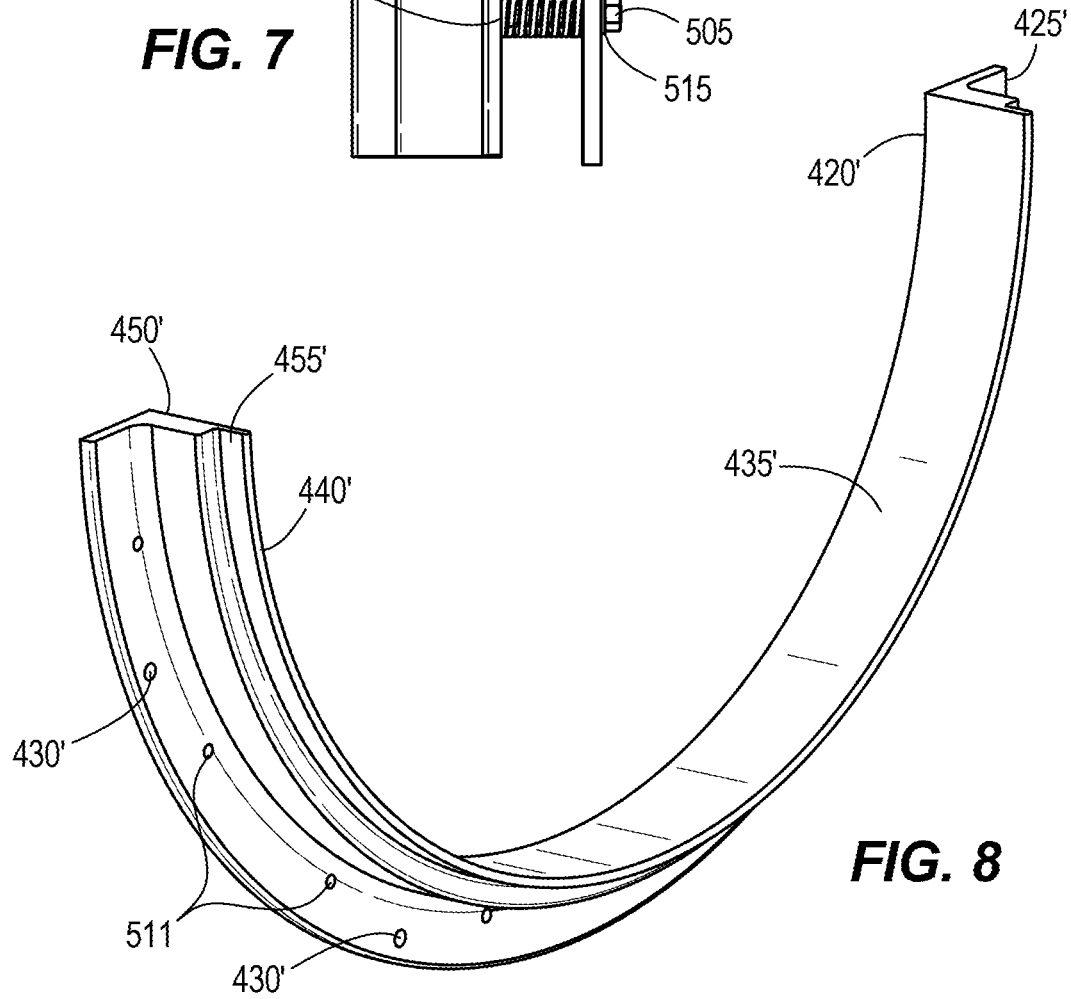
FIG. 8 is a perspective view of the roller seating ring of the roller seating device of FIG. 6.

As shown in FIG. 6, and like the tool 104, the tool 104' can take the form of two separate segments of approximately 180 degrees each. Alternatively, the tool 104' could have components split into three 120 degree segments, or various other angular split configurations. The roller seating actuator 400' can again be made of steel or other suitable metals or rigid materials, while the roller seating ring 420' can be made of a low friction material (e.g., Nylon 66). The tool 104' is used in the same manner and with the same methodology as that described above with respect to the tool 104 to properly position and orient the rollers 150, 155 during the preloading operation. As with the tool 104, in some embodiments, it may be possible to eliminate the biasing member(s) 460' and the associated axial displacement from the tool 104'. In such an embodiment, the studs 500 and/or the mounting fasteners 415' could fixedly offset the roller seating actuator 400' and the roller seating ring 420'. In such embodiments, the roller seating actuator and the roller seating ring could be integrated into a single part. However, it has been observed that the embodiment with the biasing member 460' and the associated axial displacement facilitates usage and operation of the tool 104'.

Various features and advantages of the invention are set forth in the following claims.

What is claimed is:

1. An assembly tool for positioning rolling elements of a bearing assembly only during a preloading operation and thereafter being removed from the bearing assembly, so that after removal of the assembly tool, the bearing assembly can operate under a preload established by the preloading operation, the assembly tool comprising:
    a roller seating actuator configured to be removably coupled to a portion of the bearing assembly only during the preloading operation and thereafter removed from the bearing assembly;
    a roller seating ring movably coupled to the roller seating actuator, the roller seating ring configured to be removably coupled to the portion of the bearing assembly only during the preloading operation and thereafter removed from the bearing assembly, and the roller seating ring including a distal end configured to engage an end of one or more of the rolling elements of the bearing assembly only during the preloading operation; and
    a biasing member positioned between the roller seating actuator and the roller seating ring, the biasing member biasing the roller seating ring away from the roller seating actuator such that the distal end of the roller seating ring engages and presses the one or more rolling elements axially into engagement with a rib of a race of the bearing assembly only during the preloading operation;
    wherein the roller seating actuator is configured to be removably coupled to the bearing assembly by a plurality of mounting fasteners, each of the plurality of mounting fasteners extending through a respective aperture in the roller seating actuator and a corresponding respective aperture in the roller seating ring.

2. The assembly tool of claim 1, wherein the roller seating actuator is configured to be removably coupled to an axial end face of the bearing assembly.

3. The assembly tool of claim 1, wherein each of the plurality of mounting fasteners is configured to be removably received in a respective threaded bore formed in a clamping plate of the bearing assembly.

4. The assembly tool of claim 1, wherein the biasing member includes a coil spring placed over at least one of the mounting fasteners, engaging the roller seating actuator at a first end of the coil spring, and engaging the roller seating ring at a second end of the coil spring.

5. The assembly tool of claim 1, wherein each of the plurality of mounting fasteners is configured to be removably received in a respective threaded bore formed in a housing of the bearing assembly.

6. The assembly tool of claim 1, wherein the biasing member exerts a predetermined biasing force on the one or more rolling elements, the biasing force being large enough to seat the one or more rolling elements against the rib and small enough to still permit oscillation of the one or more rolling elements during preloading.

7. The assembly tool of claim 1, wherein the assembly tool is of a split design having first and second roller seating actuator segments, and first and second respective roller seating ring segments.

8. The assembly tool of claim 7, wherein each of the first and second roller seating actuator segments, and each of the first and second roller seating ring segments is approximately 180 degrees in arc length.

9. The assembly tool of claim 1, further comprising a plurality of studs coupled between the roller seating actuator and the roller seating ring.

10. The assembly tool of claim 9, wherein the biasing member includes a coil spring placed over at least one of the studs, engaging the roller seating actuator at a first end of the coil spring, and engaging the roller seating ring at a second end of the coil spring.

11. The assembly tool of claim 1, wherein the roller seating ring includes a rim portion sized and configured to be positioned adjacent an axial end face of the bearing assembly, and an axially-extending lip portion sized and configured to extend axially from the rim portion into the bearing assembly such that the distal end abuts the one or more rolling elements.

12. The assembly tool of claim 11, wherein the lip portion of the roller seating ring includes a first portion and a second portion, wherein the first portion has a first outer diameter, and wherein the second portion includes the distal end, is axially-spaced from the first portion, and has a second outer diameter that is smaller than the first outer diameter.

13. An assembly tool for positioning rolling elements of a bearing assembly only during a preloading operation and thereafter being removed from the bearing assembly, so that after removal of the assembly tool, the bearing assembly can operate under a preload established by the preloading operation, the assembly tool comprising:
 a roller seating actuator configured to be removably coupled to a portion of the bearing assembly only during the preloading operation and thereafter removed from the bearing assembly; and
 a roller seating ring movably coupled to the roller seating actuator, the roller seating ring configured to be removably coupled to the portion of the bearing assembly only during the preloading operation and thereafter removed from the bearing assembly, and the roller seating ring including a distal end configured to engage ends of a plurality of the rolling elements of the bearing assembly upon mounting of the roller seating actuator to the bearing assembly such that the distal end of the roller seating ring engages and presses the plurality of rolling elements axially into engagement with a rib of a race of the bearing assembly only during the preloading operation;
 wherein the roller seating actuator is configured to be removably coupled to the bearing assembly by a plurality of mounting fasteners, each of the plurality of mounting fasteners extending through a respective aperture in the roller seating actuator and a corresponding respective aperture in the roller seating ring.

14. A combination of a bearing assembly and an assembly tool for positioning rolling elements of the bearing assembly during a preloading operation, the combination comprising:
 a bearing assembly including an inner ring defining thereon an inner raceway, an outer ring defining thereon an outer raceway, a rib adjacent at least one of the inner and outer raceways, a plurality of rolling elements positioned between the inner and outer raceways, a housing radially outside of the outer ring, and a clamping plate coupled with the housing via an adjustable clamping member and abutting the outer ring; and
 an assembly tool including a roller seating actuator configured to be removably coupled to at least one of the housing and the clamping plate during the preloading operation, and a roller seating ring movably coupled to the roller seating actuator, the roller seating ring including a distal end configured to engage respective ends of the rolling elements of the bearing assembly upon mounting of the roller seating actuator to at least one of the housing and the clamping plate such that the distal end of the roller seating ring engages and presses the rolling elements axially into engagement with the rib of the bearing assembly;
 wherein the clamping plate is configured to abut the outer ring such that the bearing assembly is preloaded by adjusting the adjustable clamping member while the rolling elements are pressed against the rib, and wherein the assembly tool is removed from the bearing assembly after the adjustable clamping member is adjusted to preload the bearing assembly, so that after removal of the assembly tool including the roller seating actuator and the roller seating ring, the bearing assembly can operate under a preload established by the preloading operation; and
 wherein the roller seating actuator is configured to be removably coupled to the bearing assembly by a plurality of mounting fasteners, each of the plurality of mounting fasteners extending through a respective aperture in the roller seating actuator and a corresponding respective aperture in the roller seating ring.

15. A method of installing and preloading a roller bearing assembly about a shaft, the roller bearing assembly including an inner ring defining thereon an inner raceway, an outer ring defining thereon an outer raceway, a rib adjacent at least one of the inner and outer raceways, a plurality of rolling elements positioned between the inner and outer raceways, a housing radially outside of the outer ring, and a clamping plate coupled with the housing via an adjustable clamping member and abutting the outer ring, the method comprising:
 installing each of the inner ring, the outer ring, the plurality of rolling elements, the housing, and the clamping plate about the shaft;
 removably coupling an assembly tool to at least one of the housing and the clamping plate, the assembly tool including
  a roller seating actuator removably coupled to at least one of the housing and the clamping plate;
  a roller seating ring movably coupled to the roller seating actuator, the roller seating ring including a distal end engaging respective ends of the rolling elements of the bearing assembly; and
  a plurality of mounting fasteners removably coupling the roller seating actuator to the bearing assembly, each of the plurality of mounting fasteners extending through a respective aperture in the roller seating actuator and a corresponding respective aperture in the roller seating ring;
 preloading the bearing assembly by adjusting the adjustable clamping member while the rolling elements are pressed against the rib by the assembly tool; and
 removing the assembly tool from the bearing assembly after the preloading step has been completed, so that after removal of the assembly tool including the roller seating actuator and the roller seating ring, the bearing assembly can operate under a preload established by the preloading step.

16. The method of claim 15, wherein the bearing assembly is a split bearing assembly with each of the inner ring, the outer ring, the housing, the clamping plate, and the assembly tool being split components.

17. The method of claim 15, wherein the assembly tool further includes a biasing member positioned between the roller seating actuator and the roller seating ring, the biasing member biasing the roller seating ring away from roller seating actuator such that the distal end of the roller seating ring engages and presses the rolling elements axially into engagement with the rib.

18. The method of claim 15, wherein removably coupling the assembly tool to the at least one of the housing and the clamping plate includes removably coupling the roller seating actuator to the clamping plate by installing the plurality of mounting fasteners into threaded bores formed in the clamping plate.

19. The method of claim 18, wherein removing the assembly tool includes removing the plurality of mounting fasteners from the threaded bores in the clamping plate, and wherein the method further comprises securing a seal carrier to the clamping plate by inserting seal carrier fasteners into the threaded bores in the clamping plate.

20. The method of claim 15, wherein removably coupling the assembly tool to the at least one of the housing and the clamping plate includes removably coupling the roller seating actuator to the housing by installing the plurality of mounting fasteners into threaded bores formed in the housing.

21. The method of claim 20, wherein removing the assembly tool includes removing the plurality of mounting fasteners from the threaded bores in the housing, and wherein the method further comprises securing a seal carrier to the housing by inserting seal carrier fasteners into the threaded bores in the housing.

* * * * *